UNITED STATES PATENT OFFICE.

THOMAS MACFARLANE, OF ACTON VALE, QUEBEC, ASSIGNOR OF ONE-HALF TO ALEXANDER RAMSAY, OF MONTREAL, CANADA.

MANUFACTURE OF ANHYDROUS SULPHIDE OF ZINC.

SPECIFICATION forming part of Letters Patent No. 271,090, dated January 23, 1883.

Application filed July 15, 1882. (No specimens.)

*To all whom it may concern:*

Be it known that I, THOMAS MACFARLANE, of Acton Vale, in the Province of Quebec, Dominion of Canada, have invented a new and Improved Process of Manufacturing Anhydrous Sulphide of Zinc; and I do hereby declare that the following is a full, clear, and exact description of the same.

I take the common ammoniacal liquor of the gas-works, which contains principally carbonate and hydrosulphuret of ammonia, and filter it through coarsely-ground coke or other convenient medium, so as to remove tarry matter. I then add to it a solution of sulphide of barium so long as it causes any precipitate of carbonate of baryta. The latter is allowed to subside or is filtered off, and after washing and drying is applied to any suitable or useful purpose. The supernatant liquid or filtrate, now free from carbonic acid and containing mainly hydrosulphuret of ammonia, is treated with a solution of sulphate or chloride of zinc. As soon as a precipitate of hydrated sulphide of zinc ceases to appear the whole of the latter is separated from the liquid by subsidence or filtration. The reactions for this portion of the process are as follows:

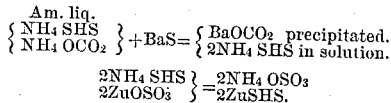

The merit and novelty of this portion of the process is to be found in the economy of the operation, for the ammoniacal liquor is a very cheap material; and the sulphide of barium, when added to this particular liquor, has a double function, for it not only eliminates the carbonic-acid gas and leaves a merchantable by-product in the shape of carbonate of baryta, but it also increases the proportion of sulphide of ammonium, and consequently the yield of sulphide of zinc. The precipitate of hydrated sulphide of zinc is then washed and dried, and is made anhydrous as follows: First it is soaked in a saturated solution of some volatile ammoniacal salts—such as hydrochlorate or sulphate of ammonia—is again dried, and exposed in a reverberatory furnace to a dull-red heat. During this process certain dark-colored organic substances precipitated with the sulphide are volatilized, and fumes of ammoniacal salts are given off, which prevent the access of air and the oxidation of the sulphide. Before the fumes cease to be given off the sulphide is withdrawn from the furnace into water, is then ground and washed, and found to yield a product of perfect whiteness, great permanency, and extraordinary covering-power. The supernatant liquid from the precipitation is evaporated to the crystallizing-point, and marketable sulphate or hydrochlorate of ammonia obtained as a by-product.

The sulphide of zinc obtained as above described possesses covering-power or "body" in a very high degree, and may be mixed or ground up in varying quantities with zinc oxide, white lead, sulphate of baryta, or any other suitable substance, for the purpose of imparting covering-power to these and increasing their value as pigments or paints.

Having now described my invention, I may state that I am aware that it has been proposed to manufacture compounds containing sulphide of zinc to be used as pigments. With the ammoniacal liquor of gas-works, however, the sulphide of barium has special reaction; and, furthermore, in the last stage of the manufacture of these compounds it is difficult, when igniting them, to expel the water and the free sulphur without oxidizing the sulphide of zinc and causing a discoloration and loss of body. I do not therefore claim the exclusive right of manufacturing sulphide of zinc; but

What I claim, and desire to secure by Letters Patent, is—

1. The process of producing zinc sulphide through the intervention of the ammoniacal liquors of gas-works, which consists in treating the latter with sulphide of barium, then removing the precipitated carbonate of baryta, and decomposing the ammonia liquid filtrate with a salt of zinc, so as to obtain a precipitated zinc sulphide, as described.

2. The process of rendering the precipitated zinc sulphide anhydrous by mixing it, when dried, with a salt of ammonia, and heating the mixture in a furnace so as to remove the water of the sulphide without oxidating the compound, as set forth.

The above specification of my invention signed by me in the presence of two subscribing witnesses.

THOMAS MACFARLANE.

Witnesses:
 EDWD. W. BYRN,
 SOLON C. KEMON.